United States Patent
Goda et al.

(10) Patent No.: US 7,858,217 B1
(45) Date of Patent: Dec. 28, 2010

(54) TOP SEALING PLATE, BATTERY USING THE TOP SEALING PLATE, AND METHOD OF MANUFACTURING THE BATTERY

(75) Inventors: Yoshio Goda, Osaka (JP); Norio Suzuki, Osaka (JP); Kiy shi Yamashita, Aichi (JP)

(73) Assignee: Panasonic Corporation, Osaka (JP)

(*) Notice: Subject to any disclaimer, the term of this patent is extended or adjusted under 35 U.S.C. 154(b) by 2102 days.

(21) Appl. No.: 09/980,880

(22) PCT Filed: Feb. 27, 2001

(86) PCT No.: PCT/JP01/01457

§ 371 (c)(1),
(2), (4) Date: Sep. 3, 2002

(87) PCT Pub. No.: WO01/63680

PCT Pub. Date: Aug. 30, 2001

(30) Foreign Application Priority Data

Feb. 28, 2000 (JP) .............................. 2000-050611

(51) Int. Cl.
*H01M 2/12* (2006.01)
(52) U.S. Cl. ........................................................ 429/53
(58) Field of Classification Search .................. 429/53, 429/57, 71, 72, 82, 163, 171, 175, 177, 180, 429/181, 185; 29/623.1, 623.2, 623.4
See application file for complete search history.

(56) References Cited

U.S. PATENT DOCUMENTS 4,662,533 A    5/1987    Takahashi et al.
6,019,802 A *  2/2000    Ishizuka et al. ............ 29/623.5

FOREIGN PATENT DOCUMENTS

| JP | 59 189557 | 10/1984 |
|----|-----------|---------|
| JP | 61 114466 | 6/1986 |
| JP | 8-273649  | 10/1996 |

(Continued)

OTHER PUBLICATIONS

Official English Translation of JP-080339785 and JP-08273649.*

(Continued)

*Primary Examiner*—R. Hodge
(74) *Attorney, Agent, or Firm*—RatnerPrestia (57) ABSTRACT

A top sealing plate used for a battery includes a filter, a cap, and a valve body. The filter has a valve hole and upper opening; the cap has a convex portion and a flange portion disposed around the convex portion; the opening end of the upper opening of the filter has a bend portion; and the outer periphery end of the flange portion of the cap and the bend portion are caulked and joined to each other. The caulked portion includes both states of contact, that is, a strong contact portion and a weak contact portion, between the surface of the outer periphery end of the flange portion and the bend portion. By this configuration, the electric contact resistance between the cap and the filter will be greatly reduced. In addition, the contact resistance is stabilized at a low level. Further, the internal resistance of the battery is lowered, thereby improving the battery performance.

23 Claims, 8 Drawing Sheets

FOREIGN PATENT DOCUMENTS

| | | | |
|---|---|---|---|
| JP | 08273649 | * | 10/1996 |
| JP | 8-339785 | | 12/1996 |
| JP | 08339785 | * | 12/1996 |
| JP | 9-237619 | | 9/1997 |
| JP | 10-159074 | | 6/1998 |

OTHER PUBLICATIONS

Japanese search report for PCT/JP01/01457 dated May 29, 2001.
English translation of Form PCT/ISA/210.
European Search Report for corresponding European Patent Application No. 01 906 345.2 dated Feb. 20, 2007.

* cited by examiner

TOP SEALING PLATE, BATTERY USING THE TOP SEALING PLATE, AND METHOD OF MANUFACTURING THE BATTERY

THIS APPLICATION IS A U.S. NATIONAL PHASE APPLICATION OF PCT INTERNATIONAL APPLICATION PCT/JP01/01457.

TECHNICAL FIELD

The present invention relates to a battery, and more particularly, to a top sealing plate used for the battery.

BACKGROUND ART

Figure 8:
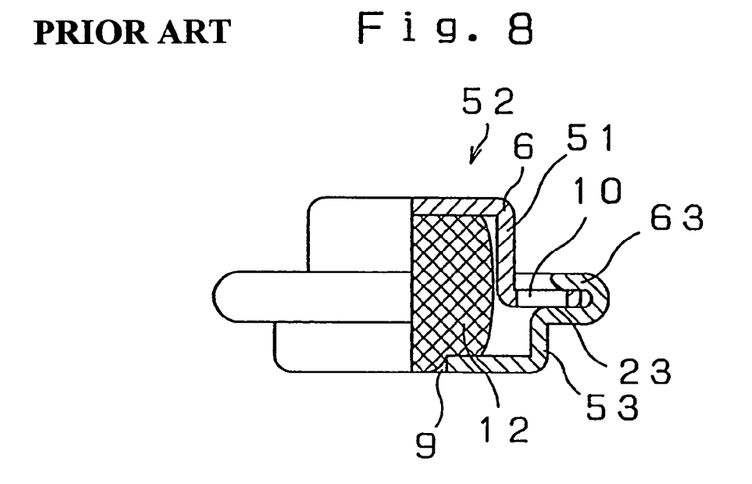
FIG. 8 shows a shape of a conventional top sealing plate. The left half of the illustration is the outside view, and the right half is the sectional view.
Figure 9:
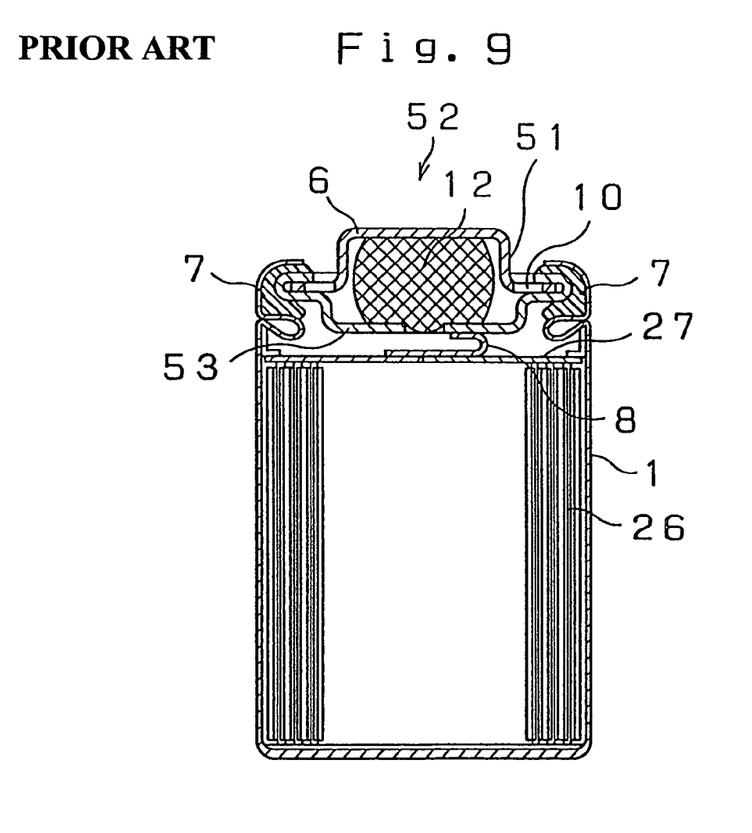
Figure 10:
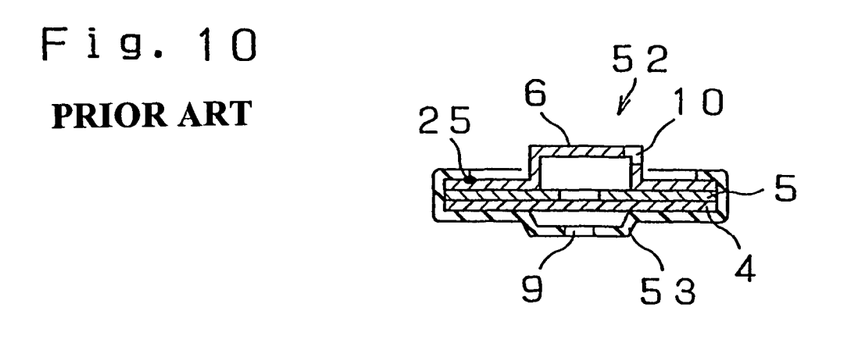
FIG. 10 is a sectional view of another conventional top sealing plate.
Figure 11:
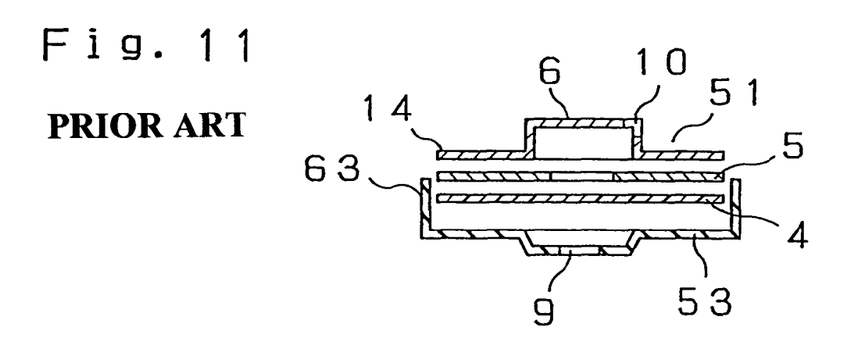
FIG. 11 is a sectional view of still another conventional top sealing plate, showing members of the top sealing plate and the shapes of various members which are about to be assembled.
Figure 12:
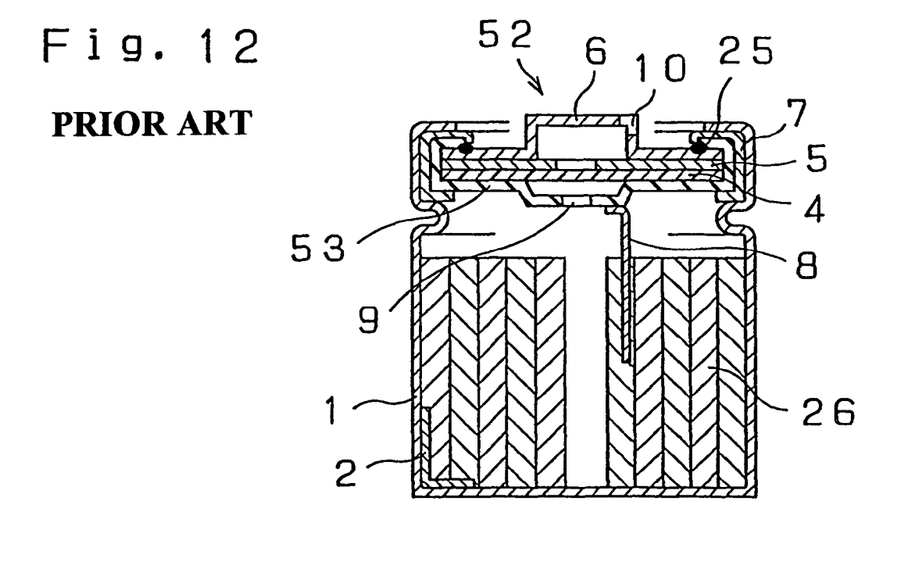

A structural diagram of a top sealing plate used for a conventional cylindrical cell is shown in FIG. 8, FIG. 10 and FIG. 11. Also, a cell provided with a conventional top sealing plate is shown in FIG. 9 and FIG. 12. A secondary battery such as a nickel cadmium, nickel hydrogen, and lithium battery comprises a battery case 1, power generating elements, lead plate 8, and top sealing plate 52. The power generating elements include a positive electrode, negative electrode, separator, and electrolyte. These power generating elements and lead plate 8 are stored in the battery case 1. The top sealing plate 52 is disposed so as to seal the opening of the battery case 1 via a gasket 7. The gasket 7 also serves a function of electrical insulation. Further, when a large volume of gas is abnormally generated in the battery case, the top sealing plate 52 functions to discharge the gas out of the battery case 1.

The top sealing plate 52 includes a convex portion 6, filter 53, cap 51, and contacts of these parts. The convex portion 6 is projected at the center of the top sealing plate 52. The convex portion 6 serves as a positive output terminal as well. The filter 53 is installed at the bottom thereof. The lead plate 8 is connected to the positive electrode. The lead plate 8 is welded to the filter 53. It is required that the top sealing plate 52 itself be low in electric resistance.

The top sealing plate 52 is available in a variety of shapes. An example of conventional top sealing plate 52 is shown in FIG. 8. FIG. 10 shows a type of top sealing plate 52 which is different from the one shown in FIG. 8. FIG. 11 shows the component parts of the top sealing plate shown in FIG. 10, illustrating what they are just before being assembled.

A brief description of the top sealing plate shown in FIG. 8 will be given in the following. The main section of the top sealing plate 52 comprises a cap 51, filter 53, and valve body 12. Generally, the cap and filter 53 are manufactured by a process where a sheet steel of about 0.3 mm thick is repeatedly pressed several times, followed by a process where the sheet steel is nickel-plated. The valve body 12 is a rubber part having a cylindrical or prism-like shape. The valve body 12 closes the valve hole 9. When the gas pressure in the battery case 1 is abnormally increased, the valve body is deformed, and then, the valve hole 9 disposed at the center of the filter 53 is opened. The gas is discharged out of the battery case 1 through gas vent hole 10. Thus, the valve body 12 has a function of discharging abnormal gas out of the battery case 1.

The convex portion 6 formed at the center of the cap 51 is used as a positive terminal. The inside of the convex portion 6 has a function of storing the valve body 12, a function of positioning the valve body 12 to the valve hole 9, and a positioning function that enables pressing the valve body against the valve hole with a specified force. At the outer periphery of the cap 51 is disposed a flange portion so as to nearly uniformly surround the entire periphery of the convex portion 6. Several gas vent holes 10 of about 1 mm in diameter are formed in the flange.

The central portion of the filter 53 has a rather deeply recessed dish shape. There is provided a valve hole 9 of about 1.5 mm in diameter at the central portion of the filter 53. The valve hole 9 serves a function of discharging the gas. With the valve body 12 stored inside the convex 6 of the cap 51, the cap 51 is fitted to the filter 53 and is centered thereto, and after that, the opening end 63 of filter 53 is inwardly pressed for caulking purpose. Finishing these processes, the cap 51 and the valve body 12 are secured to each other by the filter 53. In this way, the valve hole 9 is closed with the valve body 12. Thus, the top sealing plate 52 is completed.

However, as shown in FIG. 8 and FIG. 10, a conventional top sealing plate commonly employed is based upon the structure and manufacturing method as described in the following. That is, pressing and caulking forces are applied to the bend portion of the filter, during which time the opening end of the filter is firmly holding the flange portion of the cap under a contact pressure. However, after releasing the pressing force, the caulking strength between the flange portion of the cap and the bend portion of the filter is not high enough and unstable due to springback of the bend portion of the filter. Further, the contact pressure and contact area are very slight, and therefore, the electric contact resistance between the flange portion of the cap and the bend portion of the filter is very low and unstable. Particularly, there exist such problems in a top sealing plate used for UM-4 size cells or smaller whose outer diameter of cylindrical cell is less than φ8 mm.

Also, the caulked portion of the top sealing plate is subjected to temperature cycles and thermal shocks during use of the battery. Due to such thermal shocks and secular change, the contact pressure between the filter and the cap will be lowered. Further, the state of electrical conduction becomes unstable due to film oxide generated on the contact surfaces. Accordingly, the battery increases in internal resistance, and the output voltage of the battery is lowered.

A method of solving such problems is disclosed in Japanese Laid-open Patent No. 10-159074. The teachings of Japanese Laid-open Patent No. 10-159074 include a method comprising a process of fitting a cap 51 to a dish-shape top sealing plate having a function as a filter, and a subsequent process of inwardly bending the opening end of the dish-shape top sealing plate and securing the cap and valve body 4, and further, a process of welding the bend portion of dish-shape top sealing plate and the cap, thereby making perfect the state of electrical conduction of top sealing plate 11.

Due to the above method comprising a process of welding the bend portion of dish-shape top sealing plate and the cap, it can be anticipated that the electric resistance at the joint between the filter and the cap will be lowered, enhancing the reliability, and that the state of electrical conduction obtained will be satisfactory. However, a processing method by welding is very poorer in productivity, and also, higher in manufacturing cost as compared with a processing method by pressing. Further, in a processing method by welding, the product value will be lowered in terms of rust preventing measure and appearance. Thus, a processing method by welding is not satisfactory enough judging from a general point of view.

SUMMARY OF THE INVENTION

A top sealing plate used for a battery of the present invention comprises a filter, a cap, and a valve body, wherein the filter includes a valve hole and upper opening;

the cap has a convex portion, and a flange portion disposed around the convex portion;

the opening end of the upper opening of the filter has a bend portion;

the outer periphery end of the flange portion of the cap and the bend portion include a caulked portion that is caulked and jointed to each other;

the caulked portion is formed by caulking while the surface and back of the outer periphery end of the flange is positioned in the bend portion;

the valve body is disposed to cover the valve hole, in the space formed between the cap and the filter;

the caulked portion includes both states of contact, that is, (i) a strong contact portion and (ii) a weak contact portion, between the surface of the outer periphery end of the flange and the bend portion; and the outer periphery end comes in contact with the bend portion at the caulked portion, causing the cap and the flange portion to be electrically connected to each other.

A battery of the present invention comprises a battery case, a positive electrode, a negative electrode, electrolyte, a gasket, and a top sealing plate, wherein the positive electrode, the negative electrode, and the electrolyte are disposed in the battery case;

the battery case has an opening;

the top sealing plate in a state of being electrically insulated by the gasket is disposed at the opening of the battery case so as to close the battery case;

the filter is electrically connected to the positive electrode;

the top sealing plate comprises a filter, a cap, and a valve body;

the filter includes a valve hole and upper opening;

the cap includes a convex portion, and a flange portion disposed around the convex portion;

the opening end of the upper opening of the filter has a bend portion;

the outer periphery end of the flange portion of the cap and the bend portion include a caulked portion that is caulked and jointed to each other;

the valve body is disposed to cover the valve hole, in the space formed between the cap and the filter;

the caulked portion includes both states of contact, that is, (i) a strong contact portion and (ii) a weak contact portion, between the surface of the outer periphery end of the flange and the bend portion; and the outer periphery end comes in contact with the bend portion at the caulked portion, causing the cap and the filter to be electrically connected to each other.

A method of manufacturing a battery of the present invention comprises the steps of:

(a) disposing a positive electrode, negative electrode, and electrolyte in a battery case;

(b) manufacturing a top sealing plate;

(c) electrically connecting the filter and the positive electrode; and (d) disposing the top sealing plate at the opening of the battery case via an electrical insulating gasket, thereby closing the opening, wherein the step of manufacturing the top sealing plate comprises the steps of:

(1) forming a filter having a valve hole and upper opening;

(2) forming a bend portion by bending the opening end of the upper opening of the filter;

(3) forming a cap having a convex portion and a flange portion disposed around the convex portion;

(4) forming a caulked portion by caulking to join the outer periphery end to the bend portion while the surface and back of the outer periphery end of the flange portion of the cap are positioned in the bend portion; and (5) disposing a valve body serving to cover the valve hole in the space formed between the cap and the filter, and the step of forming the caulked portion comprises a step of electrically connecting the cap and the flange portion to each other by contacting the outer periphery end at the caulked portion with the bend portion so that the caulked portion includes both states of contact, that is, (i) a strong contact portion and (ii) a weak contact portion, between the surface of the outer periphery end of the flange and the bend portion.

By this configuration, the caulking strength of the top sealing plate for the battery will be enhanced. Further, the electric resistance at the joint of the cap and filter of which the top sealing plate is formed will be reduced, thereby improving and stabilizing the electrical conduction. As a result, it is possible to further improve and stabilize the battery performance.

BRIEF DESCRIPTION OF THE DRAWINGS

FIG. 1 (a) shows a sectional view of a top sealing plate for battery in one embodiment of the present invention, and FIG. 1 (b) is an enlarged view of same.

FIG. 2 (a) shows a sectional view of a battery using the top sealing plate for battery in one embodiment of the present invention, and FIG. 2 (b) is an enlarged view of same.

FIG. 3 (a) to FIG. 3 (d) are perspective views of caps for the top sealing plate for battery in one embodiment of the present invention. Each of the caps has a small projection or a bulge at the flange portion thereof. FIG. 3 (a) shows a cap provided, at the flange portion, with a bulge thinly extending in the radial direction and being nearly even in height in the circumferential direction. FIG. 3 (b) shows a cap provided, at the flange portion, with an angle-shape bulge extending in the radial direction. FIG. 3 (c) shows a cap provided with a plurality of conical small projections along the circumference concentric with the flange. FIG. 3 (d) shows a cap whose peripheral edge is bent and raised perpendicularly along the outermost periphery of the flange.

FIG. 6 (a) to FIG. 6 (c) show a cap for the top sealing plate for battery in one embodiment of the present invention, wherein the flange portion has a bulge, FIG. 6 (a) is a plan view and FIG. 6 (b) is a front sectional view of same, and FIG. 6 (c) is a partly enlarged view of FIG. 6 (a).

FIG. 9 shows a sectional view of a cylindrical secondary battery with a conventional top sealing plate built in.

FIG. 12 shows a sectional view of another cylindrical secondary battery with another conventional top sealing plate built in.

BEST MODE FOR CARRYING OUT THE INVENTION

A top sealing plate used for a battery of the present invention comprises a filter, a cap, and a valve body, wherein the filter includes a valve hole and upper opening;

the cap has a convex portion, and a flange portion disposed around the convex portion;

the opening end of the upper opening of the filter has a bend portion;

the outer periphery end of the flange portion of the cap and the bend portion include a caulked portion that is caulked and jointed to each other;

the caulked portion is formed by caulking while the surface and back of the outer periphery end of the flange are positioned in the bend portion;

the valve body is disposed to cover the valve hole in the space formed between the cap and the filter;

the caulked portion includes both states of contact, that is, (i) a strong contact portion and (ii) a weak contact portion, between the surface of the outer periphery end of the flange and the bend portion; and the outer periphery end comes in contact with the bend portion at the caulked portion, then the cap and the filter are electrically connected to each other.

A battery of the present invention comprises a battery case, a positive electrode, a negative electrode, electrolyte, a gasket, and a top sealing plate, wherein the positive electrode, the negative electrode, and the electrolyte are disposed in the battery case;

the battery case has an opening;

the top sealing plate in a state of being electrically insulated by the gasket so as to close the battery case is disposed at the opening of the battery case;

the filter is electrically connected to the positive electrode; and the top sealing plate has same configuration as in the top sealing plate described above.

A method of manufacturing a battery of the present invention comprises:

(a) a step of disposing a positive electrode, negative electrode, and electrolyte in a battery case;

(b) a step of manufacturing a top sealing plate;

(c) a step of electrically connecting the filter and the positive electrode; and (d) a step of disposing the top sealing plate at the opening of the battery case via an electrical insulating gasket, thereby closing the opening, wherein the step of manufacturing the top sealing plate comprises the steps of:

(1) forming a filter having a valve hole and upper opening;

(2) forming a bend portion by bending the opening end of the upper opening of the filter;

(3) forming a cap having a convex portion and a flange portion disposed around the convex portion;

(4) forming a caulked portion by caulking to join the outer periphery end to the bend portion while the surface and back of the outer periphery end of the flange portion of the cap are positioned in the bend portion; and (5) disposing a valve body serving to cover the valve hole in the space formed between the cap and the filter, and the step of forming the caulked portion comprises a step of electrically connecting the cap and the filter to each other by contacting the outer periphery end at the caulked portion with the bend portion so that the caulked portion includes both states of contact, that is, (i) a strong contact portion and (ii) a weak contact portion, between the surface of the outer periphery end of the flange and the bend portion.

Each of the cap and filter is made of electrically conductive material. The battery case is also made of electrically conductive material. The convex portion of the top sealing plate has a function as a positive terminal.

By the above configuration, the caulking strength of the top sealing plate for the battery will be enhanced. Further, the electric resistance at the joint of the cap and filter of which the top sealing plate is formed will be reduced, thereby improving and stabilizing the electrical conduction. As a result, it is possible to further improve and stabilize the battery performance.

Preferably, the outer periphery end of the flange portion includes a projection extending from at least one out of the surface and back;

the projection includes a plurality of small productions, bulges or projected peripheral edges; and the strong contact portion is formed by the projection and the bend portion contacting with each other, and the weak contact portion is formed by the bend portion contacting with zones other than the projection.

Preferably, each of the strong contact portion and the weak contact portion includes a plurality of strong contact portions and a plurality of weak contact portions; and the plurality of strong contact portions and the plurality of weak contact portions are disposed along the circumferential or radial direction of the cap.

Preferably, the plurality of projections are disposed on the surface of the outer periphery end of the flange located at the same side as the convex portion.

Preferably, the plurality of projections may vertically spring against the contact surface between the flange portion and the bend portion.

Preferably, the distance from the mating face of the filter and cap to the peaks of the plurality of productions is greater than the thickness of the flange portion; and each of the peaks is higher in contact pressure against the bend portion of the filter as compared with zones other than the peaks.

Preferably, the caulked portion includes an integral projection such that the outer periphery end and the bend portion are integrally projected;

the integral projection is formed by pressing a protuberant tool from above the bend portion against the outer periphery end being positioned in the bend portion; and the integral projection is higher in contact pressure as compared with zones other than the integral projection.

In a top sealing plate for battery in one embodiment of the present invention, small projections is formed beforehand on the surface at the convex side of the cap flange. When caulking forces are applied by a press die having a flat end so that the small projections are uniformly contacted on the whole surface of the opening end of the filter, the small projections locally strongly come into contact with the caulked portion of the filter.

In a top sealing plate for battery in another embodiment of the present invention, a bulge is intentionally formed on the surface at the convex side of the flange. The bulge may vertically spring against the flange surface. Since the bulge has spring effects, loosening due to springback at the caulked portion will be offset, and thereby, bad influences caused by loosening due to such springback can be reduced. That is, the shapes of the component parts of the top sealing plate are changed before caulking process. And, in caulking operation, the contact pressure between the cap and filter will be locally increased. As a result, it is possible to remarkably decrease the internal electric resistance of the top sealing plate.

In a top sealing plate for battery in another embodiment of the present invention, the shape of the top sealing plate before caulking operation is identical with the conventional one, but the structure of the caulked portion formed by caulking operation is different from the conventional one. That is, during the caulking process of the top sealing plate or during the additional process, uniform pressures are not applied to the entire periphery of the caulked portion, but locally strong pressures are applied thereto. Accordingly, a strong contact portion having a locally strong contact pressure and a weak contact portion having a weak contact pressure are intentionally formed by deforming the opening end of the filter. Thus, at the strong contact portion, the bend portion of the filter locally bites into the flange surface of the cap.

Preferably, the projections such as small projections or bulges formed on the flange portion of the cap are formed on the surface at the convex side. Also, the area of the projection is preferable to be less than ⅓ of the total area of the flange portion. In this way, the dimensions after completion of assembling the top sealing plate are stabilized, resulting in stabilization of the characteristics. By this configuration, bad influences due to springback inevitably generated at the caulked portion of the filter can be reduced. As a result, it is possible to obtain excellently stable electrical conduction between the filter and cap of the top sealing plate.

By the above configuration, the electric resistance at the joint between the cap serving as a positive terminal and the filter is reduced, improving the electrical conduction and stabilizing the state of contact. As a result, it is possible to obtain a battery ensuring stable battery performance.

Exemplary Embodiment 1

A top sealing plate for battery in an exemplary embodiment of the present invention will be described in the following with reference to the drawings.

Figure 1A:
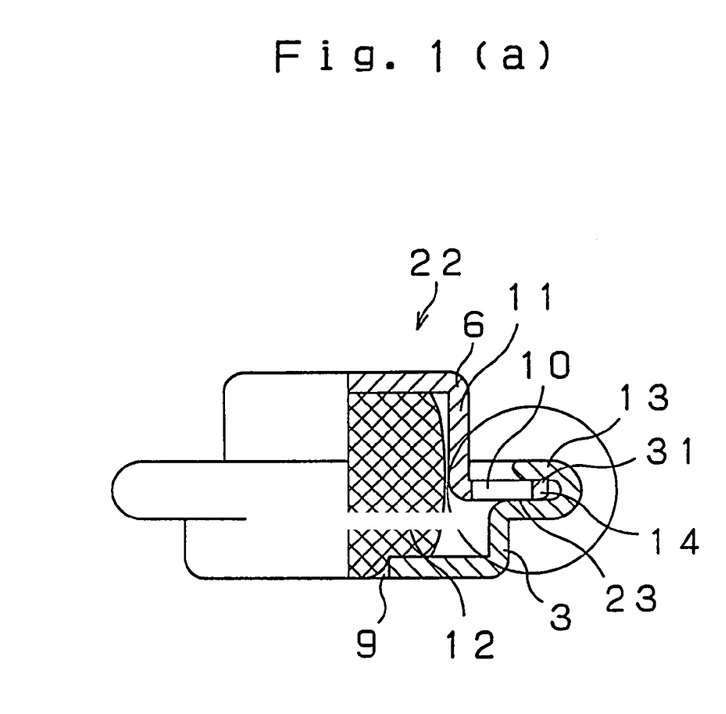
Figure 1B:
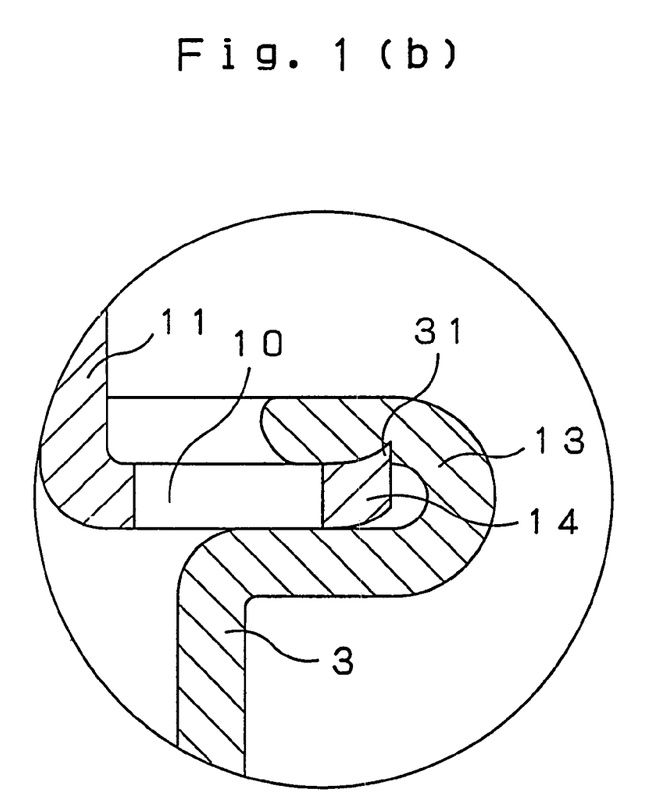
Figure 2A:
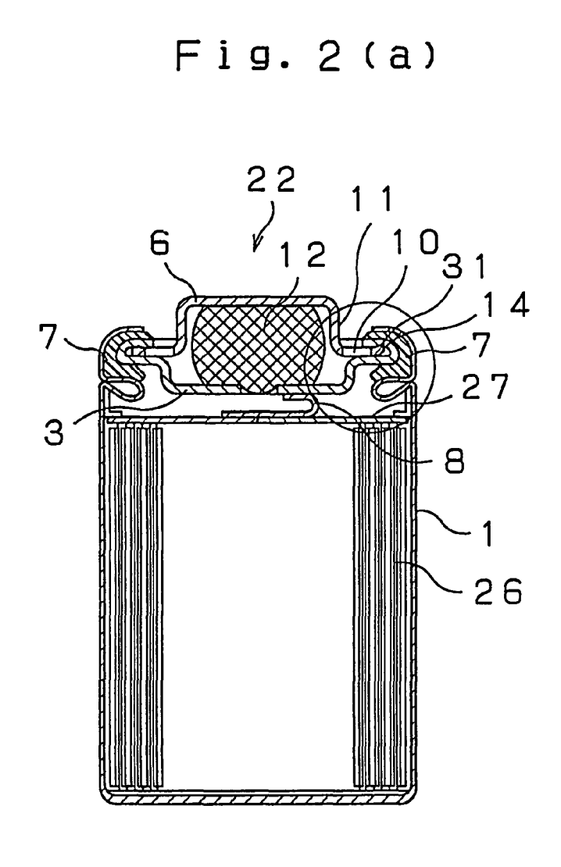
Figure 2B:
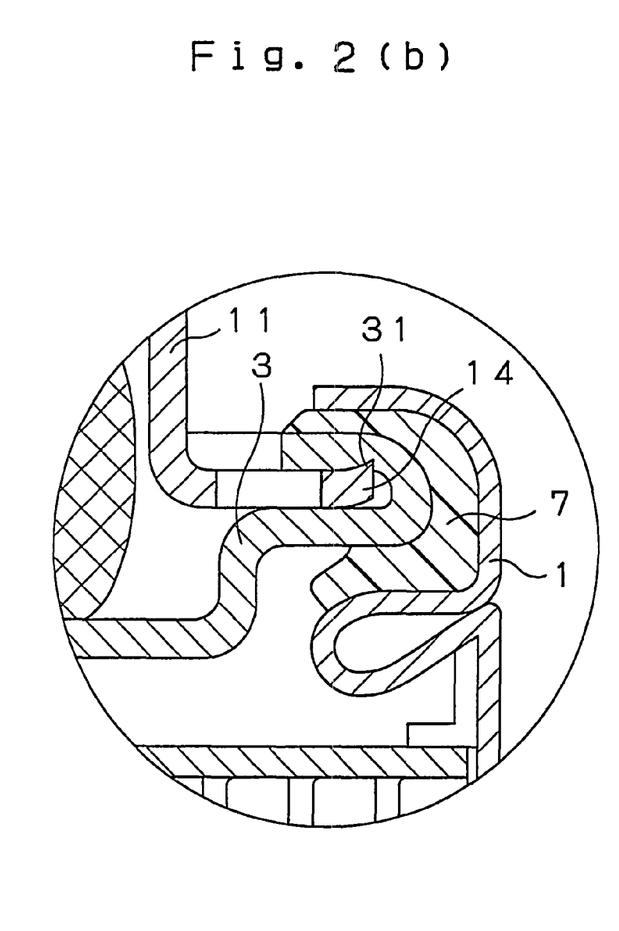

FIG. 1 (a) shows a sectional view of a top sealing plate for battery in one embodiment of the present invention. FIG. 1 (b) is a partly enlarged view of same. FIG. 2 (a) shows a sectional view of a battery using the top sealing plate. FIG. 2 (b) is a partly enlarged view of same. The top sealing plate 22 includes a cap 11, filter 3, and rubber valve body 12. The filter 3 has an upper opening formed in the top surface thereof and a valve hole 9 formed in the bottom surface thereof. The rubber valve body 12 is used as an example of the valve body. The valve body 12 is disposed in the top sealing plate 22 so as to close the valve hole 9. The cap 11 is disposed so as to close the upper opening of the filter 3. The cap 11 includes a convex portion 6 formed at the center thereof and a filter 14 disposed around the convex portion 6. A gas vent hole 10 is formed in the filter 14. The filter 3 has a dish-shape, and in the center of the filter 3 is formed the valve hole 9. When gas is generated in the battery, the gas is discharged out of the battery through the valve hole 9 and gas vent hole 10. The cap 11 and filter 3 are made of electrically conductive material such as metals. Projection 31 is formed on the surface or back of the outer periphery end of the flange 14 of the cap 11. The projection 31 includes at least one out of a plurality of small projections 16, a plurality of bulges 15, and peripheral edge 17 extending from the outer periphery end which are described later.

In FIG. 2 (a) and FIG. 2 (b), the battery comprises a battery case 1, a group of electrodes 26, collector plate 27, top sealing plate 11, positive electrode lead plate 8, and gasket 7. The top sealing plate 11 has a structure shown in FIG. 1. The positive electrode lead plate 8 serves to connect the collector plate 27 to the top sealing plate 11. The top sealing plate 11 is disposed at the opening of the battery case via the gasket 7. The convex portion 6 of the cap 11 functions as an output terminal for positive electrode of the battery. Since the other top sealing plate and battery configurations are same as the conventional top sealing plate and battery configurations already described, the description is here omitted.

FIG. 3 (a) to FIG. 3 (d) show perspective views of several examples of flange shapes of the cap for top sealing plate. In FIG. 3 (a) to FIG. 3 (d), the cap 11 includes flange portion 14 and convex portion 6. The flange portion 14 is formed around the convex portion 6.

Projection 31 such as conical small projection 16, locally formed bulge 15 or peripheral edge 17 is formed on the surface or back of the outer periphery end of the flange portion 14 of the cap 11. Preferably, the projection 31 is formed on the same side as the convex portion 6. Such projection 31 may vertically spring against the flange surface. In this configuration, caulking is performed while the outer periphery end of the flange portion 14 is positioned in the bend portion of filter 3. Thus, the projection 31 is strongly contacted on the bend portion. Each of the flange portion and opening end 13 has (i) a locally strong contact portion and (ii) a weak contact portion. As a result, bad influences due to springback generated at the caulked portion of the filter can be reduced.

The features of these component parts will be described in the following.

In FIG. 3 (a), the bulge 15 is formed at the flange portion 14. The bulge 15 is formed at the convex portion 6 side. The bulge 15 has a trapezoidal shape radially extending about 1 mm in width and about 0.1 mm in height as viewed vertically from the axial center of the cap. The bulge 15 may vertically spring against the flange surface. Caulked portion 13 is formed by the upper opening end of the filter 3 and the outer periphery end of flange portion 14 of the cap 11. The upper opening end of the filter 3 includes a bend portion that is inwardly bent, which is caulked while the outer periphery end of the flange portion is positioned in the bend portion. In this way, the outer periphery end of the filter and the flange portion 14 of the cap 11 are caulked and jointed to each other. In the caulking process, the bulge 15 of the flange portion 14 is more strongly contacted on the caulked portion 13 of the filter 3 as compared with zones other than the bulge 15.

Figure 3A:
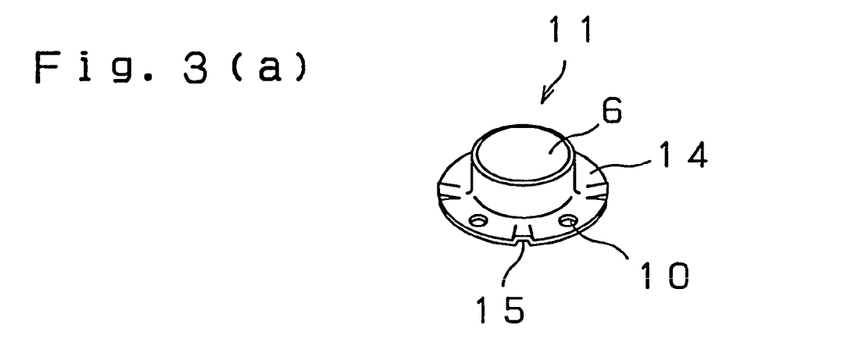
Figure 3B:
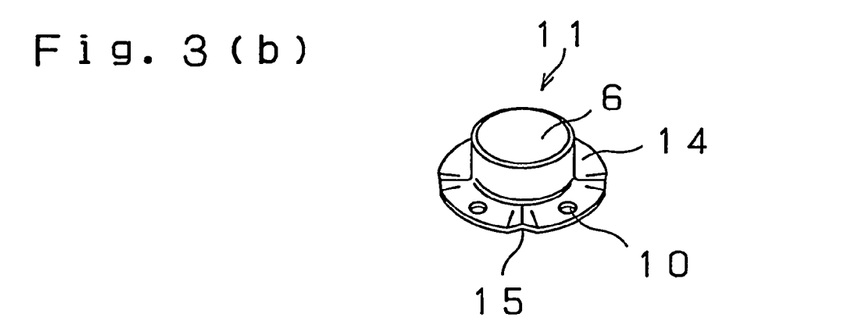
Figure 3C:
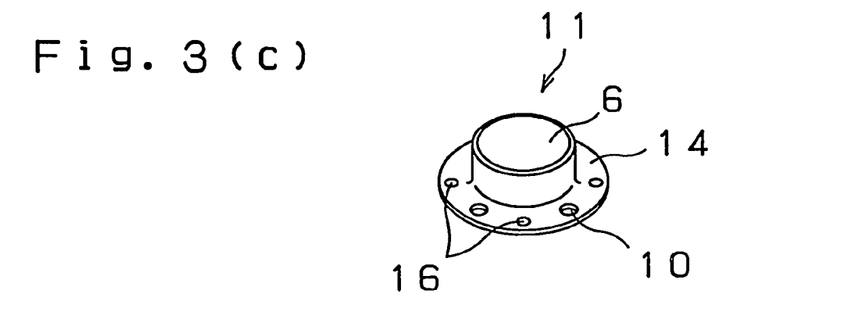
Figure 3D:
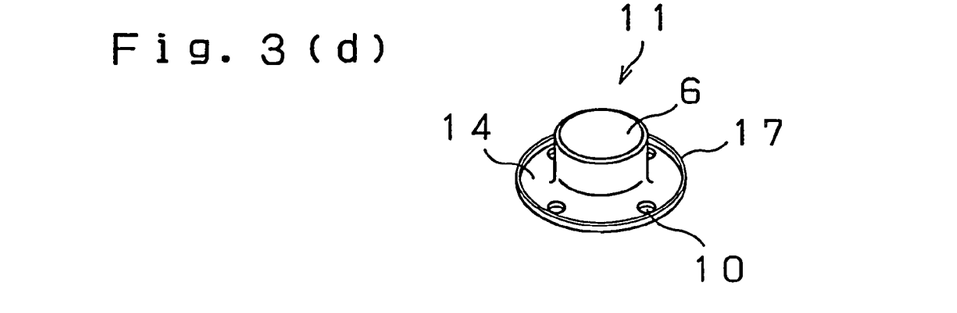

Further, the bulged portion may vertically spring against the flange surface, and therefore, loosening due to springback, if generated at the caulked portion 13, will be offset. Accordingly, the state of contact between the filter and cap is stabilized. As a result, the electric contact resistance becomes decreased and stabilized. Further, rubber valve body 12 stored inside the convex portion 6 and filter 3 is stabilized in height, and consequently, the gas discharge pressure that is the original function as top sealing plate 22 is also stabilized.

The cap shown in FIG. 3 (b) has a bulge 15 formed at the flange portion, and the bulge 15 has an angular shape. The other shapes are identical with those of FIG. 3 (a) described above. Since the bulge 15 has an angular shape, the bulge 15 further ensures excellent spring effects. For example, the angular shape of the bulge 15 is about 0.1 mm in height, and the lower slope of the bulge 15 is about 1.5 mm in width. Loosening due to springback generated at the caulked portion is absorbed by the bulge 15 having such shape. As a result, the electric contact resistance is decreased and stabilized.

The cap shown in FIG. 3 (c) has a plurality of conical small projections 16 formed at the flange portion. The small projections 16 are formed concentric with the flange portion 14 on the same surface side as the convex portion 6 of the flange portion. Each of the conical small projections is about 0.15 mm in height and about 0.8 mm in bottom diameter. When the bend portion of the filter is caulked so as to cover the outer periphery end of the flange portion 14, the peaks of the small projections 16 come into strong contact with the opening end of the filter. Or, the peaks of the small projections 16 bite into the opening of the filter. In this way, the filter and the cap may come into stable contact electrically and mechanically.

The projection and bulge in the above embodiment are formed at four portions equally spaced apart along the circumferential or radial direction of the flange. However, these projections and bulges are not limited to forming at four portions equally spaced apart, but for example, the projections and bulges may be formed at a plurality of portions, and the shapes, positions and quantities of projections and bulges can be freely determined so that they are formed in positions where the cap and the filter can be reliably positioned.

The cap shown in FIG. 3 (d) has a peripheral edge 17 formed at the outer periphery end of flange 14. The peripheral edge 17 has a uniformly low height over the entire periphery of the flange 14, and the height is, for example, about 0.15 mm. Caulking is performed while the peripheral edge 17 is positioned in the bend portion. Due to the caulking operation, the peripheral edge 17 is strongly contacted on the flange portion. By this configuration, when the bend portion of the filter 3 is caulked so as to cover the outer periphery end of the flange portion 14, even in case the caulked portion 13 has slight springback, the state of contact between the cap and filter is maintained by the peripheral edge 17, thereby reducing the bad influences caused by springback. Accordingly, it is possible to perform sturdy and reliable caulking, and to make the electric contact resistance between the filter and cap portion stabilized at a low level.

FIG. 1 (b) and FIG. 2 (b) show the configuration by which the bulge 15 is formed out of the above bulge 15, small projection 16, and peripheral edge 17, as one embodiment of projection 31.

Figure 4:
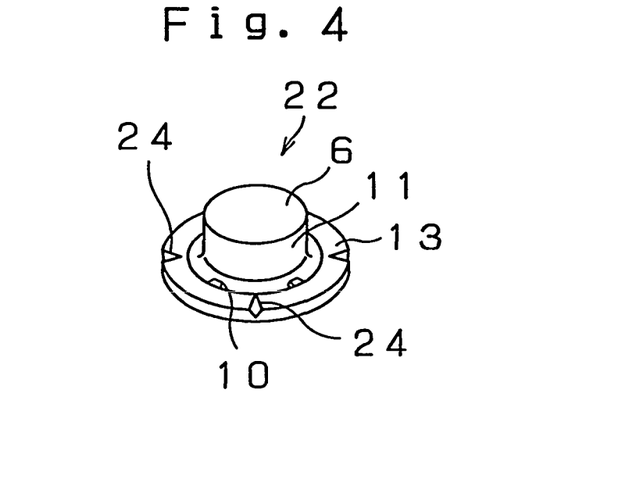
FIG. 4 is a perspective view of a top sealing plate for battery in one embodiment of the present invention, wherein locally strong pressures are applied to the caulked portion at the outer periphery of the top sealing plate, thereby stabilizing the state of contact between the cap and the filter.
Figure 5:
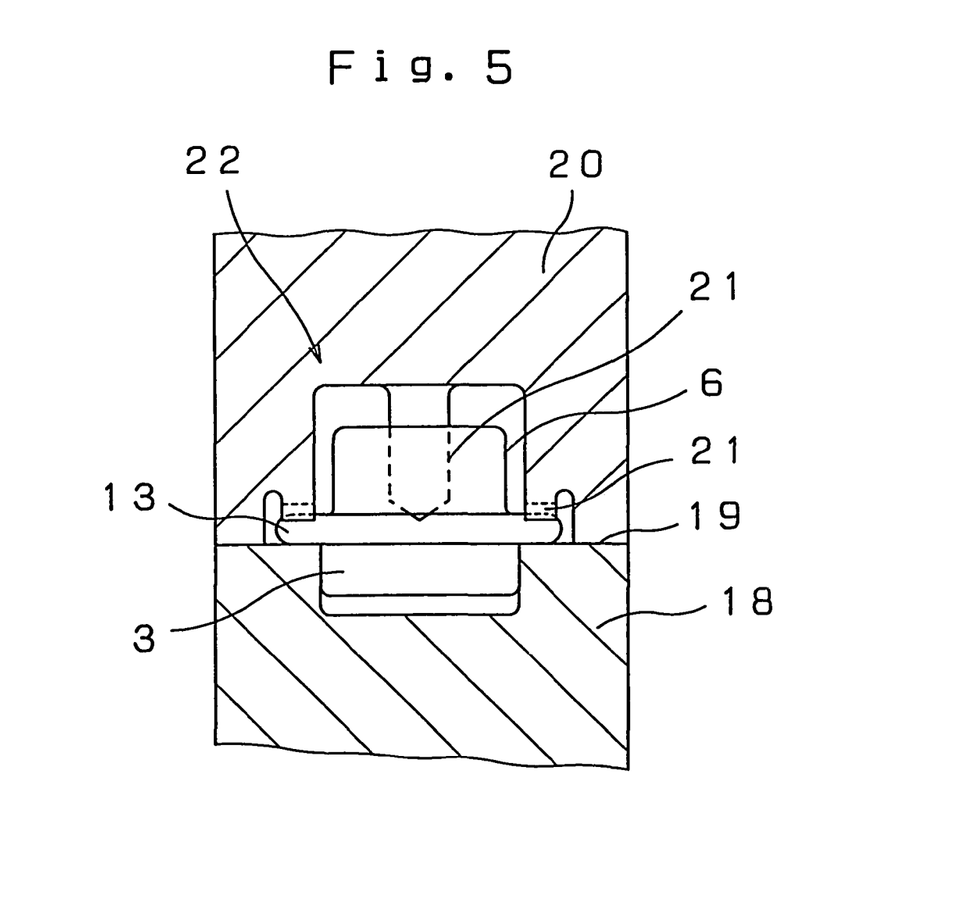
FIG. 5 shows a method of manufacturing a top sealing plate for battery in one embodiment of the present invention, wherein locally strong pressures are applied to the caulked portion at the outer periphery of the top sealing plate by means of a press die.

FIG. 4 shows the appearance of a top sealing plate in another embodiment. In FIG. 4, top sealing plate 22 includes a portion 24 where the cap and filter are in a state of strong contact, and a portion where both are in a state of weak contact. The top sealing plate 22 comprises (a) a step of forming a cap having a flange 14 evenly flat over the entire periphery around convex portion 6, the same as a conventional cap; (b) a step of caulking the cap and filter while the outer periphery end of the flange portion is positioned in the bend portion of filter 3; and (c) a step of locally applying pressures to several portions from above the caulked portion 13 by using a press die with a punch whose tip has wedge-like sharpness at several portions, as shown in FIG. 5. In this manufacturing method, portion 24 where the cap and filter are in a state of strong contact and a portion where both are in a state of weak contact are intentionally created. Preferably, in the portion 24 where the cap and filter are in a state of strong contact, the cap and filter are joined to each other in a state such that the bend portion bites into the flange portion.

FIG. 5 is a sectional view showing the method of processing top sealing plate 22 shown in FIG. 4. In FIG. 5, the top sealing plate 22 once caulked and set up is supported by the lower die 18 of the press. Wedge-like portion 21 where the tip of the upper die 20 of the press has wedge-like sharpness at several portions is pressed against the caulked portion 13 at the outer periphery of the top sealing plate 22, thereby locally applying pressures thereto. The wedge-like portion 21 of the upper die is used as an example of a protuberant tool. In this way, the wedge-like tip portion 21 bites into the top sealing plate 22, and thereby, the top sealing plate 22 is deformed. Thus, generation of loosening due to springback of the caulked portion can be prevented. Further, it is possible to make perfect the state of contact between the cap 11 and the filter 3.

Figures 6A, 6B, 6C:
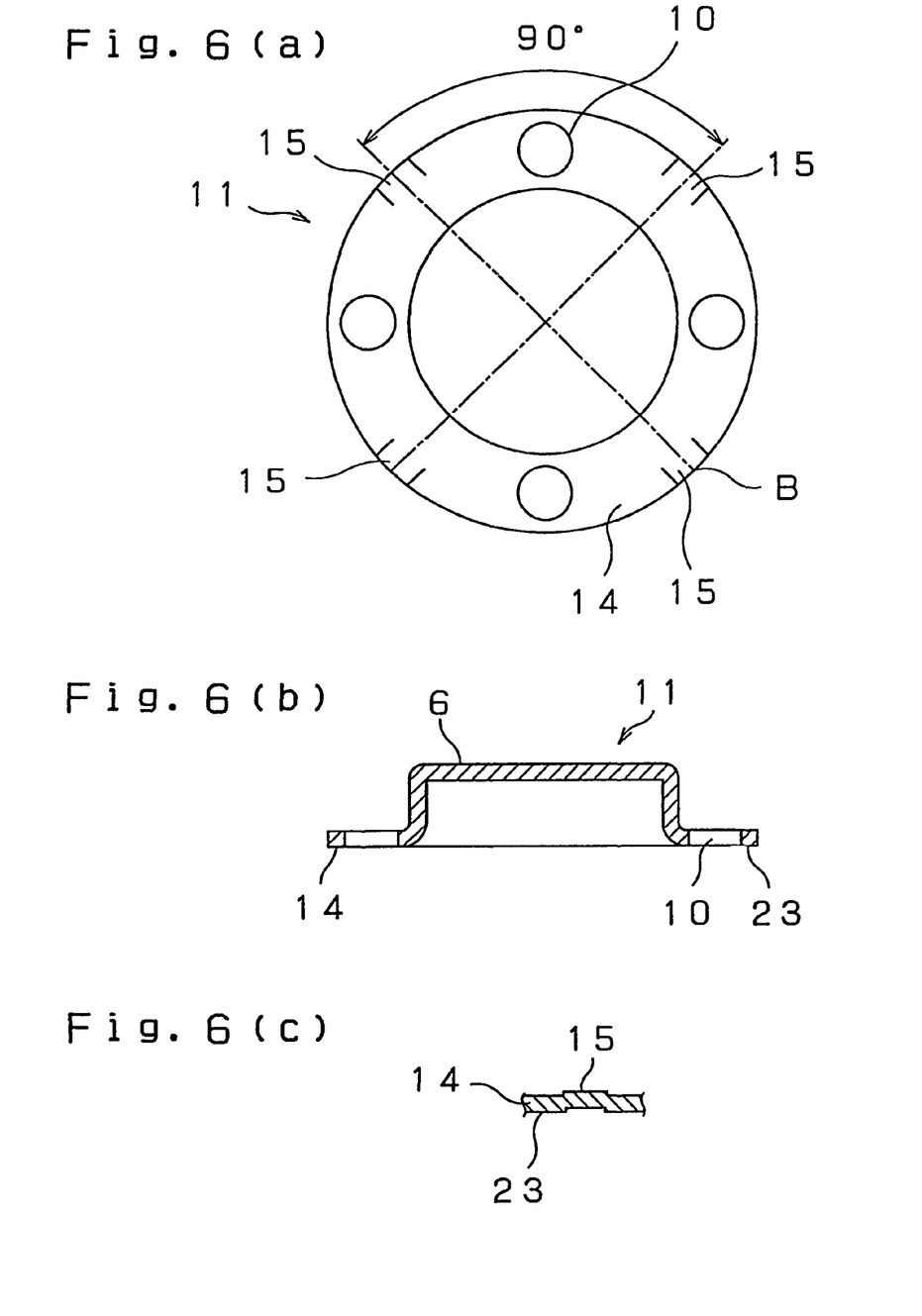

FIG. 6 (a) to FIG. 6 (c) show an example in which a cap used for a top sealing plate in one embodiment of the present invention is applied as a cap for cylindrical cells actually mass-produced. FIG. 6 (a) is a plan view of the cap. FIG. 6 (b) is a front sectional view of same. FIG. 6 (c) is an enlarged sectional view of the bulge formed at the flange portion. In the figures, cap 11 includes a convex portion 6 and flange 14. Gas vent hole 10 is formed in the flange 14. The flange 14 includes a mating face 23 of the cap and filter.

Fifty caps having such shape were manufactured by using SPC steel sheet of 0.3 mm in, thickness. And 50 top sealing plates were made by using each of the caps. In this case, the filter is also 0.3 mm in thickness. With respect to 20 top sealing plates out of the 50 top sealing plates, the caulked portion height "H" and the internal resistance "R" of the top sealing plate were measured.

On the other hand, as a comparative example, a conventional top sealing plate as shown in FIG. 8 was also manufactured to measure the caulked portion height "H" and the internal resistance "R" of the top sealing plate. For the conventional top sealing plate, a cap having no bulge was used. The caulked portion height "H" is the measured value of the central portion of the bulge.

Figure 7:
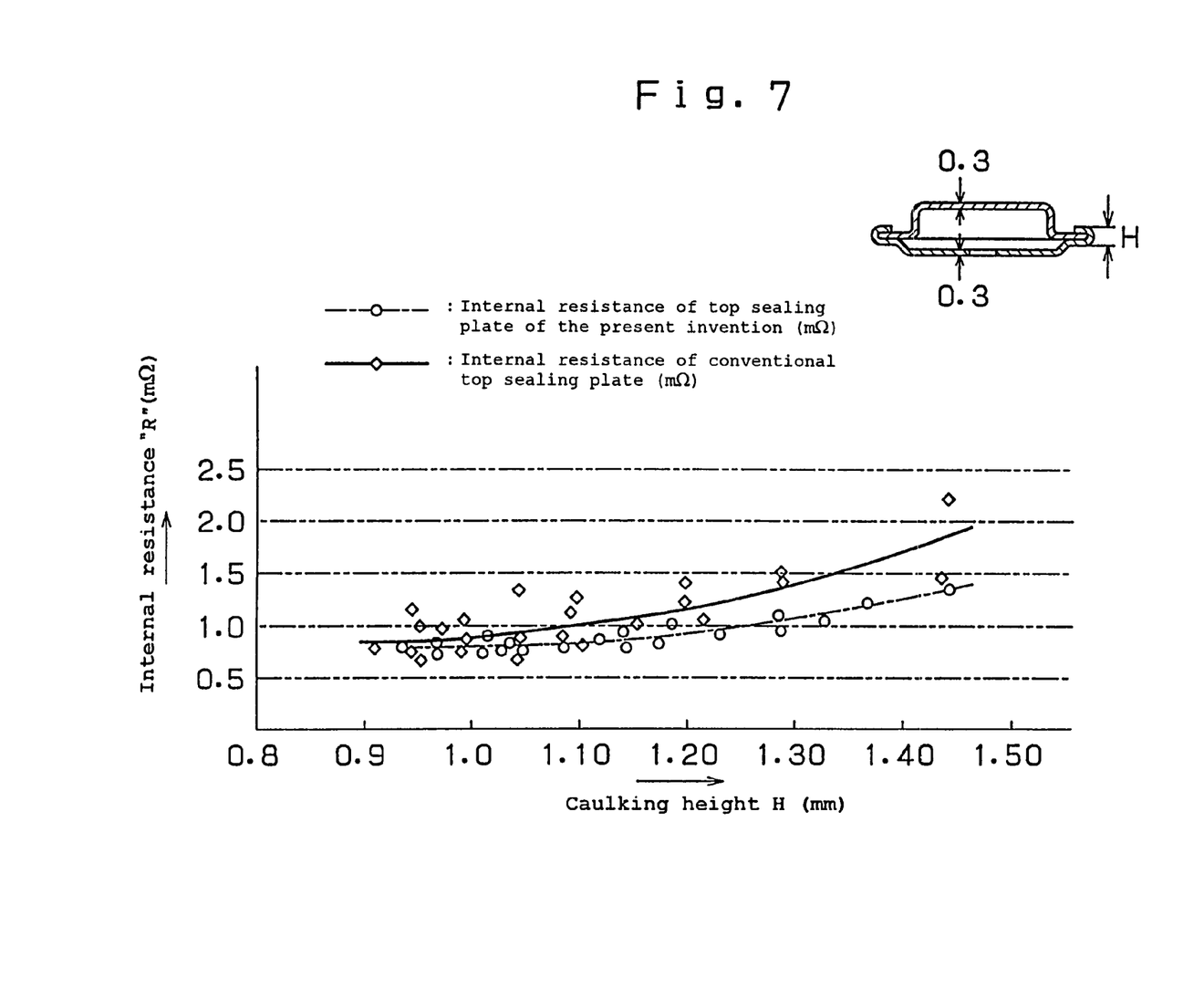
FIG. 7 is a graph showing the result of measurement of the top sealing plate caulking height and internal resistance, comparing the result obtained by measuring one embodiment of the present invention with the result obtained by measuring a conventional top sealing plate.

The measurement data are shown in FIG. 7 as a graph. In FIG. 7, the internal resistance "R" of the top sealing plate in the present embodiment is smaller than the internal resistance of the conventional one. Further, the internal resistance "R" of the top sealing plate in the present embodiment is less in variation as compared with the conventional one. That is, the internal resistance "R" of the top sealing plate in the present embodiment is rather stable and lower in resistance value as compared with the conventional one. Particularly, even in case the caulking height "H" exceeds 1 mm, the internal resistance "R" of the top sealing plate in the present embodiment is relatively stabilized as compared with the conventional one.

When the plate thickness of the cap and filter is 0.3 mm, the caulked portion height "H" is preferable to be 0.98 mm or less. In this case, the above advantage will be further enhanced.

INDUSTRIAL APPLICABILITY

The flange portion of the cap and the filter are in a state of contact including a strong contact portion and a weak contact portion. As a method of forming a strong contact portion, a projection is formed at the flange portion, and the projection is strongly contacted on the filter. Thus, loosening is canceled out by the spring effects of the projection formed at the flange portion. Also, conical small projections formed at the flange portion bite into the filter that is the mating part. In this way, loosening of the caulked portion and unstable contact may be prevented. Accordingly, the electric contact resistance between the cap and filter will be greatly reduced. In addition, the contact resistance is stabilized at a low level. Further, the internal resistance of a secondary battery using such top sealing plate becomes decreased, and as a result, the battery characteristics will be improved.

REFERENCE NUMERALS IN THE DRAWINGS

| | |
|---|---|
| 1 | Battery case |
| 2 | Negative lead wire |
| 3 | Filter (dish-shaped top sealing plate) |
| 4 | Valve body |
| 5 | Reinforcement |
| 6 | Convex portion |
| 7 | Gasket |
| 8 | Positive lead plate |
| 9 | Valve hole |
| 10 | Gas vent hole |
| 11 | Cap |
| 12 | Valve body |
| 13 | Caulked portion (bend portion of upper opening end of filter, and outer periphery end of flange portion of cap) |
| 14 | Flange |
| 15 | Bulge |
| 16 | Small projection |
| 17 | Peripheral edge |
| 18 | Lower press die |
| 19 | Lower and upper press die abutment |
| 20 | Upper press die |
| 21 | Wedge-like portion of press die |
| 22 | Top sealing plate |
| 23 | Cap and filter mating face |
| 24 | Locally pressurized portion |
| 25 | Weld zone |
| 26 | Electrodes |
| 27 | Collector |
| 31 | Projection |
| H | Caulking height |
| R | Internal resistance of top sealing plate |

The invention claimed is:

1. A top sealing plate used for a battery, comprising:
a filter, a cap, and a valve body,
wherein
said filter includes a valve hole and upper opening;
said cap has a convex portion, and a flange portion disposed around said convex portion;
an opening end of said upper opening of said filter has a bend portion;
an outer periphery end of said flange portion of said cap and said bend portion include a caulked portion that is caulked and jointed to each other;
said caulked portion is formed by caulking while said outer periphery end of said flange is positioned in said bend portion;
said valve body is disposed to cover said valve hole, in a space formed between said cap and said filter;
said caulked portion includes a first contact portion and a second contact portion between the surface of the outer periphery end of said flange and said bend portion, a contact pressure of said first contact portion is stronger than a contact pressure of said second contact portion;
said outer periphery end of said flange portion includes a projection extending from at least one out of the surface and the back thereof;
said first contact portion is formed from a contact of said projection and said bend portion; and
said cap and said filter are electrically connected to each other by the contact with said outer periphery end and said bend portion at said caulked portion.

2. The top sealing plate of claim 1,
wherein
said first contact portion is one of a plurality of first contact portions, said second contact portion is one of a plurality of second contact portions, and said caulked portion includes said first contact portions and said second contact portions; and
said first contact portions and said second contact portions are disposed along the circumferential or radial direction of said cap.

3. The top sealing plate of claim 1,
wherein
said projection includes at least one selected from the group consisting of a plurality of small projections, bulges, and peripheral edge projected from the surface of said flange.

4. The top sealing plate of claim 1,
wherein said projection is disposed on the surface of said outer periphery end of said flange positioned at the same side as said convex portion.

5. The top sealing plate of claim 1,
wherein
said projection has vertically spring against the contact surface between said flange portion and said bend portion.

6. A top sealing plate used for a battery, comprising:
a filter, a cap, and a valve body,
wherein said filter includes a valve hole and upper opening;
said cap has a convex portion, and a flange portion disposed around said convex portion;
an opening end of said upper opening of said filter has a bend portion;
an outer periphery end of said flange portion of said cap and said bend portion include a caulked portion that is caulked and jointed to each other;
said caulked portion is formed by caulking while said outer periphery end is positioned in said bend portion;
said valve body is disposed to cover said valve hole, in a space formed between said cap and said filter;
a surface of said outer periphery end of said flange has a projection;
said outer periphery end including said projection and said bend portion are caulked;
said cap and said filter are electrically connected to each other, by contact between said outer periphery end at said caulked portion and said bend portion;
the distance from a mating face of said filter and cap to the peak of said projection is greater than the thickness of said flange portion; and
each of the peaks has a stronger contact pressure against said bend portion of said filter as compared with zones other than said peaks.

7. The top sealing plate of claim 6,
wherein said projection includes at least one selected from the group consisting of a plurality of small productions, bulges, and projected peripheral edge.

8. A top sealing plate used for a battery, comprising:
a filter, a cap, and a valve body,
wherein said filter includes a valve hole and upper opening;
said cap has a convex portion, and a flange portion disposed around said convex portion;

an opening end of said upper opening of said filter has a bend portion;

an outer periphery end of said flange portion of said cap and said bend portion include a caulked portion that is caulked and jointed to each other;

said caulked portion is formed by caulking while said outer periphery end is positioned in said bend portion;

said valve body is disposed to cover said valve hole, in a space formed between said cap and said filter;

said cap and said filter are electrically connected to each other, by contact between said outer periphery end at said caulked portion and said bend portion;

said caulked portion includes an integral projection such that said outer periphery end and said bend portion are integrally projected;

said integral projection is formed by pressing a protuberant tool from above the bend portion, in a state that said outer periphery end is positioned in said bend portion; and said integral projection has a stronger contact pressure as compared with zones other than said integral projection.

9. The top sealing plate of claim 8, wherein said battery comprises a battery case, and a positive electrode, negative electrode, electrolyte, gasket and said top sealing plate disposed in said battery case; and said battery case has a circular opening;

said top sealing plate is disposed at said opening of said battery case, in a state of being electrically insulated by said gasket so as to close said battery case; and said filter is electrically connected to said positive electrode.

10. A battery, comprising:

a battery case, a positive electrode, a negative electrode, electrolyte, a gasket, and a top sealing plate, wherein said positive electrode, said negative electrode, and said electrolyte are disposed in said battery case;

said battery case has an opening;

said top sealing plate is disposed at the opening of said battery case, in a state of being electrically insulated by said gasket so as to close said battery case;

said filter is electrically connected to said positive electrode;

said top sealing plate comprises a filter, cap, and valve body;

said filter has a valve hole and upper opening;

said cap has a convex portion, and a flange portion disposed around said convex portion;

an opening end of said upper opening of said filter has a bend portion;

an outer periphery end of said flange portion of said cap and said bend portion include a caulked portion that is caulked and jointed to each other;

said caulked portion is formed by caulking while said outer periphery end is positioned in said bend portion;

said valve body is disposed to cover said valve hole, in a space formed between said cap and said filter;

said caulked portion includes a first contact portion and a second contact portion between the surface of the outer periphery end of said flange and said bend portion, a contact pressure of said first contact portion is stronger than a contact pressure of said second contact portion;

said outer periphery end of said flange portion includes a projection extending from at least one out of the surface and the back thereof;

said first contact portion is formed from a contact of said projection and said bend portion; and said cap and said filter are electrically connected to each other, due to contact established between said outer periphery end and said bend portion at said caulked portion.

11. The battery of claim 10, wherein said projection includes at least one selected from the group consisting of a plurality of small projections, bulges, and projected peripheral edge;

said strong contact portion is formed by said projection and said bend portion contacting with each other; and said weak contact portion is formed by zones other than said projection and said bend portion contacting with each other.

12. The battery of claim 10, said first contact portion is one of a plurality of first contact portions, said second contact portion is one of a plurality of second contact portions, and said caulked portion includes said first contact portions and said second contact portions; and said first contact portions and said second contact portions are disposed along the circumferential or radial direction of said cap.

13. The battery of claim 11, wherein the plurality of projections are disposed on the surface of said outer periphery end of said flange positioned at the same side as said convex portion.

14. The battery of claim 11, wherein said projection has vertically spring against the contact surface between said flange portion and said bend portion.

15. The battery of claim 11, wherein the distance from the mating face of said filter and cap to the peaks of said plurality of projections is greater than the thickness of said flange portion; and each of said peaks has a stronger contact pressure against said bend portion of said filter as compared with zones other than said peaks.

16. The battery of claim 11, said caulked portion includes an integral projection such that said outer periphery end and said bend portion are integrally projected;

said integral projection is formed by pressing a protuberant tool from above the bend portion, in a state that said outer periphery end is positioned in said bend portion; and said integral projection has a stronger contact pressure as compared with zones other than said integral projection.

17. A method of manufacturing a battery, comprising the steps of:

(a) disposing a positive electrode, a negative electrode, and electrolyte in a battery case;

(b) manufacturing a top sealing plate;

(c) electrically connecting said filter and said positive electrode; and (d) disposing said top sealing plate at the opening of said battery case via an electrical insulating gasket in order to close the opening, wherein the step of manufacturing said top sealing plate comprises the steps of:

(1) forming a filter having a valve hole and upper opening;

(2) bending the opening end of the upper opening of said filter, to form a bend portion;

(3) forming a cap having a convex portion and a flange portion disposed around said convex portion;

(4) caulking to join the outer periphery end to said bend portion while the surface and back of the outer periphery end of said flange portion of said cap are positioned in said bend portion, to form a caulked portion; and (5) disposing a valve body serving to cover the valve hole in a space formed between said cap and said filter, and wherein the step of forming said cap includes forming a projection at said outer periphery end of said flange portion, said projection extending from at least one out of the surface and the back thereof; and the step of forming said caulked portion includes a step of electrically connecting said cap and said filter to each other by contacting the outer periphery end at said caulked portion with said bend portion so that said caulked portion includes a first contact portion and a second contact portion between the surface of the outer periphery end of said flange and said bend portion, a contact pressure of said first contact portion is stronger than a contact pressure of said second contact portion.

18. The method of manufacturing a battery of claim 17, wherein said projection includes at least one selected from the group consisting of a plurality of small projections, bulges, and projected peripheral edge;

said strong contact portion is formed by said projection and said bend portion contacting with each other; and said weak contact portion is formed by zones other than said projection and said bend portion contacting with each other.

19. The method of manufacturing a battery of claim 17, wherein said first contact portion is one of a plurality of first contact portions, said second contact portion is one of a plurality of second contact portions, and said caulked portion includes said first contact portions and said second contact portions; and said first contact portions and said second contact portions are disposed along the circumferential or radial direction of said cap.

20. The method of manufacturing a battery of claim 18, wherein said projections are disposed on the surface of the outer periphery end of said flange positioned at the same side as said convex portion.

21. The method of manufacturing a battery of claim 18, wherein said projection has vertically spring against the contact surface between said flange portion and said bend portion.

22. The method of manufacturing a battery of claim 18, wherein the distance from the mating face of said filter and cap to the peak of said projection is greater than the thickness of said flange portion; and each of said peaks has a stronger contact pressure against said bend portion of said filter as compared with zones other than said peaks.

23. The method of manufacturing a battery of claim 17, wherein the step of forming said caulked portion includes a step of forming an integral projection at said outer periphery end and said bend portion, by pressing a protuberant tool from above the bend portion while the surface and back of said flange portion of said cap are positioned in said bend portion; and said integral projection has a stronger contact pressure as compared with zones other than the integral projection.

* * * * *